(12) United States Patent
Moore et al.

(10) Patent No.: US 6,293,088 B1
(45) Date of Patent: Sep. 25, 2001

(54) GAS TURBINE WITH STEAM COOLING AND FUEL ATOMIZATION

(75) Inventors: Jack D. Moore, Chuluota; Brad A. Steinebronn, Oviedo, both of FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/450,345

(22) Filed: Nov. 29, 1999

(51) Int. Cl.[7] .................................. F02C 3/30; F02C 7/16
(52) U.S. Cl. .......................... 60/39.3; 60/39.58; 60/39.75
(58) Field of Search ................. 60/39.182, 39.3, 60/39.48, 39.55, 39.58, 39.75; 415/114

(56) References Cited

U.S. PATENT DOCUMENTS

| | | |
|---|---|---|
| 3,080,716 | 3/1963 | Cummings et al. . |
| 4,932,204 | 6/1990 | Pavel et al. . |
| 5,161,365 | 11/1992 | Wright . |
| 5,233,823 | 8/1993 | Day . |
| 5,313,790 | 5/1994 | Barr . |
| 5,340,274 * | 8/1994 | Cunha .................................. 60/39.58 |
| 5,357,746 | 10/1994 | Myers et al. . |
| 5,490,377 | 2/1996 | Janes . |
| 5,581,997 | 12/1996 | Janes . |
| 5,613,356 * | 3/1997 | Frutschi ............................ 60/39.182 |
| 5,619,855 | 4/1997 | Burrus . |
| 5,640,840 | 6/1997 | Briesch . |
| 5,644,911 | 7/1997 | Huber . |
| 5,687,560 | 11/1997 | Janes . |
| 5,826,430 | 10/1998 | Little . |
| 5,865,030 | 2/1999 | Matsuhama . |
| 5,953,900 * | 9/1999 | Bannister et al. ................... 60/39.05 |

* cited by examiner

Primary Examiner—Louis J. Casaregola

(57) ABSTRACT

This invention relates to a combustion turbine power plant having a gas turbine. The plant includes a compressor for generating a compressed gas stream, a fuel delivery system for supplying a combustible fuel to the gas turbine, a combustor for receiving the compressed gas stream and fuel and generating a high temperature working gas, a turbine section for receiving the working gas from the combustor and expanding the working gas through the turbine section to produce rotating shaft power, a steam generator for supplying cooling steam to components of either the combustor and/or the turbine to extract heat therefrom and cool the same and, a steam outlet manifold for collecting the cooling steam and selectively directing at least a portion thereof to either, or both, the fuel delivery system to atomize the fuel oil entering said combustor or the turbine to augment the power output of the turbine.

12 Claims, 1 Drawing Sheet

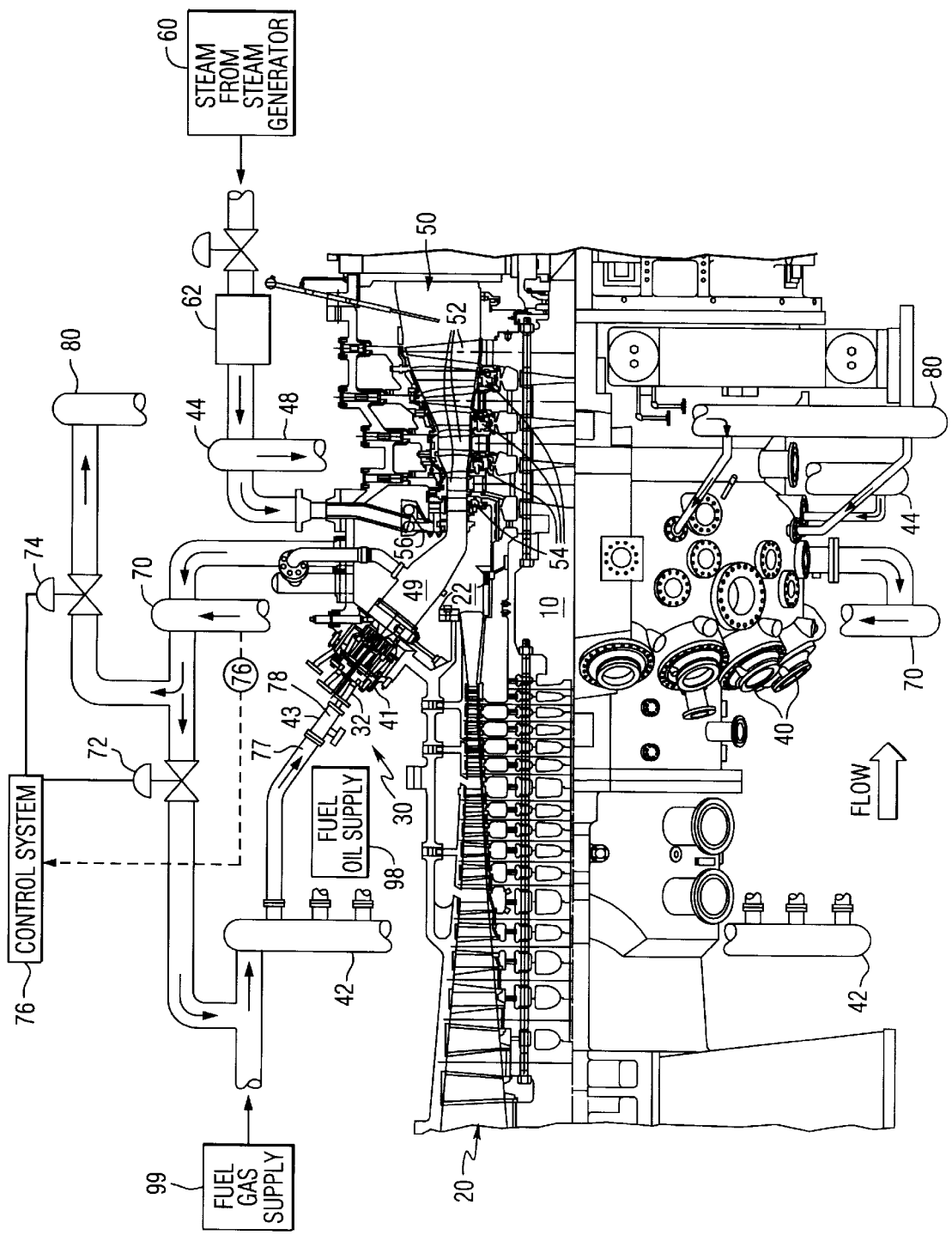

GAS TURBINE WITH STEAM COOLING AND FUEL ATOMIZATION

BACKGROUND OF THE INVENTION

1. Field of the Invention

The invention relates to combustion turbine power plants and more particularly to fuel heating systems for combustion turbine power plants.

2. Background Information

It is known in the art to provide steam to preheat combustion fuel oil to vaporize the oil for use in combustion turbine systems. Typically an intermediate fluid, such as water, is heated until it becomes a gas, then the steam is mixed with the fuel oil, thereby heating and atomizing the fuel oil. The fuel heating steam may be provided by a separate steam boiler. Such a boiler adds a significant cost to the power plant. Alternatively, it is known in the art to indirectly utilize the exhaust gas from the combustion turbine to heat the steam. This type of system can be more costly due to the additional heat exchanger.

One prior art approach disclosed in U.S. Pat. No. 4,932,204 recovers heat available in the exhaust gas of the combustion turbine by increasing the water flow through the economizer section to a rate in excess of that required to match the steam production rate in the evaporator section. The excess water flow is withdrawn from the heat recovery steam generator at a temperature approaching the evaporator temperature and used to preheat the fuel delivered to the combust of the combustion turbine.

Another approach proposed to preheat fuel oil is to use waste heat from the combustion turbine rotor air cooler to raise the fuel temperature to above 600° F. (315° C.) One draw back to using the rotor air cooler waste energy is that it requires a complex arrangement and sophisticated controls to maintain relatively constant fuel temperature while simultaneously maintaining the required cooling for the rotor over the possible range of operating loads for the turbine.

Therefore, what is needed is a combustion turbine fuel heating system that is simple, economical, will allow the fuel oil to be heated above 600° F., if desired, and can be used in a simple or combined cycle combustion turbine power plant.

SUMMARY OF THE INVENTION

These needs and others are satisfied by the invention which is directed to a combustion turbine system which includes a manifold coupled with the steam cooling system of the combustion turbine. Steam passes through the combustion turbine, cooling the combustion turbine and absorbing heat. After passing through the combustion turbine the steam enters a outlet manifold where its flow can be controlled and directed concurrently or alternately to a nozzle placed at the combustion turbine compressor discharge cavity for power augmentation and/or it can be directed to the fuel oil nozzles thereby heating and atomizing the fuel oil and increasing the efficiency of the thermal cycle. By utilizing the cooling steam from the combustion turbine it is possible to eliminate the multimillion dollar cost of a separate steam boiler to provide steam to the fuel manifold.

Additionally, this invention can be incorporated into a combustion turbine using two alternative fuel sources; natural gas and oil. A fuel manifold is coupled to a natural gas source and the steam outlet manifold. The fuel manifold is further coupled to a fuel nozzle. The fuel nozzle includes a mixing chamber which is coupled with a fuel oil source. In operation, the combustion turbine can use either natural gas or fuel oil. When natural gas is used, the natural gas is introduced into the fuel manifold, passes through the mixing chamber and is injected by the nozzles into the combustor. When fuel oil is used, steam is introduced into the fuel manifold and fuel oil is introduced into the mixing chamber, when the steam passes into the mixing chamber the fuel oil is vaporized prior to being injected by the nozzles into the combustor.

BRIEF DESCRIPTION OF THE DRAWINGS

A full understanding of the invention can be gained from the following description of the preferred embodiments when read in conjunction with accompanying drawing in which:

FIG. 1 is a partial cross-sectional view of a combustion turbine according to the present invention.

DESCRIPTION OF THE PREFERRED EMBODIMENT

As shown in FIG. 1, the combustion turbine system 10 comprises a compressor 20 for generating a compressed gas stream, a fuel delivery system 30, a combustor assembly 40, a combustor transition assembly 49, a turbine assembly 50 and a steam generator 60 all cooperate in a manner well known in the prior art. In operation, the compressor 20 inducts ambient air and compresses it. The compressed air is channeled to compressor discharge cavity 22 which encompasses the combustor assembly 40. The combustor assembly 40 includes a plurality of combustors 41. The fuel delivery system 30 is also coupled with the combustor assembly 40. The fuel delivery system 30 introduces fuel to each combustor 41 through a plurality of fuel nozzles 32. Each nozzle 32 includes a mixing chamber 43 which is further coupled to both a fuel oil source 98 and the fuel manifold 42. The fuel manifold 42 may additionally be connected to a fuel gas source 99. The fuel manifold 42 is also coupled to the steam outlet manifold 70 (described below). In operation, when fuel oil is being used, a portion of the steam from the steam outlet manifold 70 is directed to the fuel manifold 42. The fuel manifold 42 directs the steam to each mixing chamber 43 where it is mixed with fuel oil from the fuel oil source. The steam atomizes the fuel oil so that it may be injected into each combustor 41 through each nozzle 32 to be ignited. Alternatively, if natural gas is used as the fuel, steam is not introduced into the fuel manifold 42. Instead, natural gas is introduced to the fuel manifold 42 and will pass from the fuel manifold 42, through mixing chambers 43, and through each nozzle 32 into the combustors 41 to be ignited.

In the combustor assembly 40, the compressed air mixes with the fuel and is ignited, becoming the working gas. From the combustor assembly 40, the working gas is channeled to the turbine assembly 50, wherein the working gas expands through a plurality of rotating blades 52 and stationary vanes 54, generating shaft power as is commonly known. After passing through the turbine assembly 50, the working gas is exhausted from the system.

Due to the ignition of the fuel in the combustor assembly 40, the combustor transition assembly 49 is subject to temperatures in excess of 1000° F. (537° C.). Additionally, as the hot working gas passes through the turbine assembly 50, it too is subjected to similar temperatures. To cool the combustor transition assembly 49 and turbine assembly 50, a cooling system 48 is incorporated into both. The cooling system 48 includes the steam generator 60, and a steam inlet manifold 44 which is coupled with a series of passages 56 within portions of the combustor transition assembly 49 and turbine assembly 50. The cooling system 48 uses cooling steam generated by steam generator 60. Steam from steam generator 60 is passed through a filter 62 prior to being channeled into the steam inlet manifold 44. When the steam reaches the steam inlet manifold 44 it is preferably 500° F. (260° C.). The steam is channeled from the steam inlet manifold 44 into the internal passages 56 where it absorbs heat from the combustor transition assembly 49 and the turbine assembly 50. The internal passages 56 exist in the combustor transition assembly 49 and extend through the stationary vanes 54, and may extend through the rotating blades 52, in the turbine assembly 50. Details about the steam passages 56 (not shown) are discussed in detail in U.S. Pat. No. 5,640,840, which is owned by the assignee of the present application. U.S. Pat. No. 5,640,840 is herein incorporated by reference in its entirety. As the steam passes through the passages 56 its temperature is raised to approximately 1000° F. (537° C.). The heated steam is then channeled to a steam outlet manifold 70.

The steam outlet manifold 70 includes a control system 76 which controls the steam throttle valves 72, 74 which will direct steam to either or both the power augmentation manifold 80 (described below) and the fuel manifold 42. The control system 76 includes a first sensor 77 which determines the type of fuel being used and provides a first output. Based on the first output, the control system 76 will direct the steam to the power augmentation manifold 80 if natural gas is being used as the fuel. If fuel oil is being used as the fuel, the control system 76 directs a portion of the steam to the fuel manifold 42, where is passes into the mixing chambers 43 and atomizes the fuel oil. The control system 76 incorporates at least a second sensor 78, such as a temperature and/or pressure sensor for monitoring the characteristics of the steam. The control system 76 compares the input from the second sensor 78 to a selected standard and adjusts valves 72 and 74 to vary the steam/fuel oil ratio. The amount of steam directed to the fuel manifold 42 maintains the predetermined fuel oil mass flow to steam mass flow ratio, which is sufficient to ensure proper atomization of the fuel oil. If there is excess steam in the steam outlet manifold 70 not required to heat the fuel oil, such steam can be redirected to the power augmentation manifold 80 and to the compressor discharge cavity 22. Steam which is directed to the fuel manifold 42 atomizes the fuel oil in the mixing chambers 43 so that it may be injected into the combustor 44 through a plurality of fuel nozzles 32. If a higher oil to steam mass ratio is desired, steam will be redirected to the power augmentation manifold 80. If a higher steam to oil mass ratio is desired, additional steam will be directed to the fuel manifold 42.

As noted above, any excess steam in the steam outlet manifold 70 will be directed to the power augmentation manifold 80. The power augmentation manifold 80 is preferably coupled to the compressor assembly 40 so that any excess steam may be introduced into the flow at the compressor discharge cavity 22. However, the excess steam may be introduced into the flow at any point.

While a specific embodiment of the invention has been described in detail, it will be appreciated by those skilled in the art that various modifications and alternatives to those details could be developed in light of the overall teachings of the disclosure. For example, those skilled in the art could utilize a sensor other than the temperature sensor to monitor the condition of the fuel being injected into the system. Accordingly, the particular arrangement disclosed is meant to be illustrative only and not limiting as to the scope of the invention which is to be given the full breath of the claims appended in any and all equivalence thereof.

What is claimed is:

1. A combustion turbine power plant having a gas turbine, the power plant comprising:

(a) a compressor for generating a compressed gas stream;

(b) a fuel delivery system for supplying a combustible fuel to said gas turbine;

(c) a combustor for receiving said compressed gas stream from said compressor and said fuel from said fuel delivery system and generating a high temperature working gas;

(d) a turbine section for receiving said working gas from said combustor and expanding said working gas through the turbine section to produce rotating shaft power;

(e) a steam generator in fluid connection with said combustor and said turbine;

(f) a steam outlet manifold in fluid connection with said fuel delivery system and said turbine for collecting said steam and selectively directing corresponding portions of said steam to said fuel delivery system and said turbine, said fuel delivery system being adapted to selectively atomize the fuel entering said combustor;

(g) an sensor proximate said fuel delivery system for monitoring a control characteristic of said selectively atomized fuel and providing a representative output;

(h) a control system adapted to receive said representative output from said sensor, compare said representative output with a selected standard, and produce a control signal based upon said comparison; and (i) a valve operatively connected with said control system, said valve adapted to control the portion of the steam that is directed to said fuel delivery system in response to said control signal.

2. The power plant of claim 1 wherein said sensor is a temperature sensor.

3. The power plant of claim 1 wherein said sensor is a pressure sensor.

4. The power plant of claim 1 wherein said sensor is both a temperature sensor and a pressure sensor.

5. The power plant of claim 1 wherein said fuel delivery system is in fluid connection with a plurality of fuel sources, said fuel delivery system being capable of delivering at least two alternative fuels to said combustor.

6. The power plant of claim 5 wherein said plurality of fuel sources includes a source of gas and a source of fuel oil.

7. The power plant of claim 6 wherein said fuel delivery system selectively supplies either natural gas or fuel oil to said combustor.

8. The power plant of claim 7 wherein said fuel delivery system includes at least one fuel nozzle that interfaces said fuel delivery system with said combustor wherein said steam directed to said fuel delivery system atomizes the fuel through the fuel nozzle.

9. The power plant of claim 8 wherein said at least one nozzle includes a mixing chamber adapted to mix steam and fuel, said mixing chamber coupled to said a fuel oil source.

10. The power plant of claim 9 including a fuel manifold, said fuel manifold coupled to said steam outlet manifold, said natural gas source and said mixing chamber.

11. The power plant of claim 10 including:

(a) a sensor proximate said fuel delivery system for monitoring the type of fuel used by said combustor and providing a representative fuel type output;

(b) a control system for receiving said fuel type output and in accordance therewith selectively directing corresponding portions of said steam to said fuel manifold, to said combustor upstream of the compressor exhaust and to said combustion gas exiting said combustor and entering said turbine if said fuel is natural gas.

12. The power plant of claim 11 wherein said sensor is both a temperature sensor and a pressure sensor.

* * * * *